Jan. 8, 1963 H. M. MACKINNON 3,071,808
MELT-SPINNING SYNTHETIC POLYMER FILAMENTS
Filed May 29, 1961
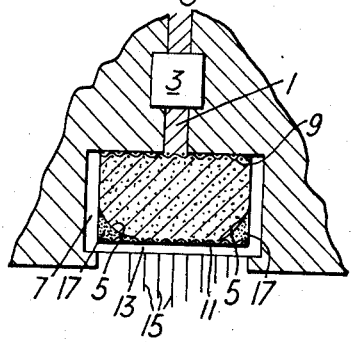
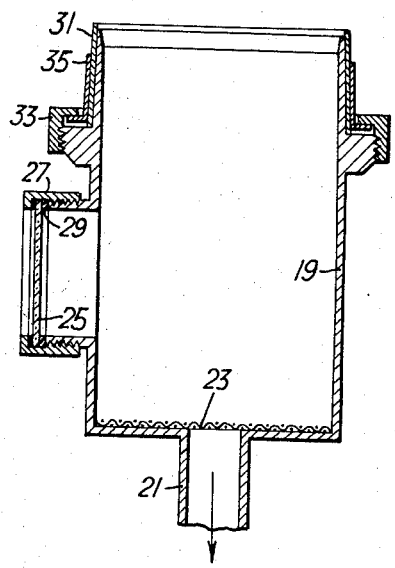
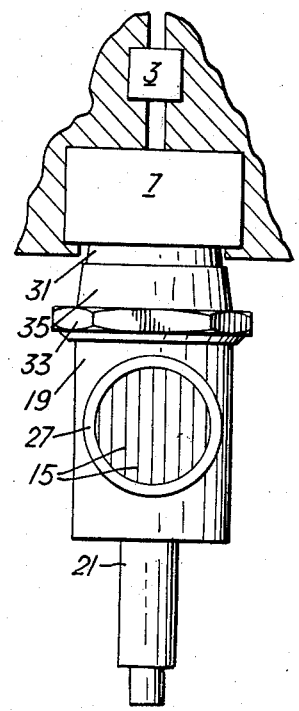
Inventor
HUGH MARQUIS MACKINNON
By
Cushman, Darby & Cushman
Attorneys

United States Patent Office 3,071,808
Patented Jan. 8, 1963

---

3,071,808
MELT-SPINNING SYNTHETIC POLYMER FILAMENTS
Hugh Marquis Mackinnon, Cwmbran, England, assignor to British Nylon Spinners Limited, Pontypool, England
Filed May 29, 1961, Ser. No. 113,238
Claims priority, application Great Britain June 11, 1960
7 Claims. (Cl. 18—8)

The present invention concerns improvements in or relating to melt-spinning synthetic polymer filaments.

In the melt-spinning process, which is the process used for the extrusion of filaments from such fibre-forming materials as the synthetic linear polyamides, polyesters, polyethylenes and polypropylenes, molten fibre-forming material is continuously supplied from a melter or a continuous polymerization apparatus to a spinneret containing one or more small orifices, and the material is extruded through the orifice or orifices under the pressure exerted on it at the back of the spinneret, such pressure usually being brought about by the action of a rotary metering pump in the supply line of the molten material. It is a common practice in such melt-spinning processes to include a fine grain filter between the spinning pump and the spinneret in order that the pressure necessary to force the molten material through the filter shall apply shear to the polymeric material and shall eliminate any gas bubbles present in the molten material as supplied by the pump, and in order that any foreign bodies in the material may be prevented from reaching the spinneret. Such a filter often comprises sand or other fine grain, inert, particulate substance; and the filter and spinneret are often combined in apparatus known as a pack which can be handled as a unit for insertion in, or removal from, a port in the melt-spinning unit itself. The pack may also contain wire mesh or perforated plate screens above and below the filter medium; and an aluminium foil may be laid on top of the lower screen, to prevent any of the particles of the filter medium from being forced into and possibly blocking a spinneret orifice, such foil only being ruptured at points in it where, initially, it is forced down upon raised portions of the lower screen by the pressure of the molten material upon the solid particulate substance of the filter resting upon the foil.

It is to be understood that, although the above general description of the extrusion portion of melt-spinning apparatus is a convenient one for use in the present specification, the invention shortly to be described is not limited to such apparatus specifically, although it is specifically limited to apparatus comprising a spinneret, a filter medium at the back of the spinneret and means for supplying molten fibre forming material under pressure to the filter medium. Instead of said or other particulate material forming the filter medium, such may comprise a porous sintered metal plate or plates, for instance; or indeed, a plurality of fine mesh woven screens or perforated plates may comprise the said filter medium.

Whatever the filter medium employed, such packs have to be changed at intervals, say of some 100 hours, more or less, owing to their having become so blocked with matter filtered from the molten material that the output of the pack drops below that requisite for uniform spinning. A pack change is, of necessity, an interruption to spinning, causing an amount of waste to be produced; but every effort is naturally taken to ensure that the amount of waste is kept to a minimum, as, for instance, by pre-heating the packs to the temperature of the spinning block, and by shaking them to ensure that the various layers of particulate material, if such is used, are level, all such efforts being made in order that uniform spinning through the spinneret of the new pack may be established as quickly as possible.

Unfortunately, despite the above efforts that are made, it is the case, more particularly with some processes than with others, that uniform spinning is not established for many minutes, or even hours, after a new pack has been inserted owing to the phenomenon known as "spitting"; and, indeed, "spitting" may be so bad as to preclude normal spinning at all, through the pack in question. This phenomenon manifests itself in a drastic interruption in uniform extrusion of molten material through one or more of the spinneret orifices; and we now believe that such phenomenon is caused by entrapped gas bubbles in the molten material, said bubbles probably being of nitrogen obtained from aid that is present within the pack prior to its having been completely "purged" by the molten material forced through it. In particular we have observed that "spitting" is more prolonged, leading to filament breakages after spinning has been commenced, from the outer orifices of a multi-orifice spinneret, due to the fact that, when the metering pump is started, the molten material advances through the pack with a convex-shaped leading portion resulting in the formation of an annular "pocket" of air in the region of the periphery of the lower screen after the leading central portion of the advancing molten material has arrived at the back of the spinneret.

A principal object of this invention is the reduction and, possibly, the elimination of the above-mentioned "spitting" phenomenon and the non-uniform or broken filament consequences thereof.

According to the invention, a process for melt-spinning synthetic polymer filaments comprises expelling air from within the pack of a melt-spinning unit immediately prior to the commencement of spinning therethrough and maintaining the pack substantially free of air or its constituent gases until a sole filament, or all of a plurality of filaments, has or have emerged from an orifice, or orifices, in the spinneret contained in the pack.

The preferred manner of expelling the air, and of maintaining the pack air-free until extrusion of filaments actually commences, is by continuous evacuation of the pack, in advance of the flow of molten material, through the orifices of the spinneret. Conveniently, this may be achieved by means of a funnel connected by means of a flexible tube to a source of vacuum, the diameter of the lip of the funnel being such that all the orifices of the spinneret in question are encompassed by the funnel when it is pressed in vacuum-tight connection with the face of the spinneret.

The funnel may be of metal with a window of e.g. "Perspex" (regd. trademark), and the vacuum seal effected by an annular gasket or sleeve of heat-resistant rubber, i.e. rubber that will withstand a temperature of, say, 285° C. in the case of melt-spinning filaments from polyhexamethylene adipamide (nylon 66). Alternatively, the funnel may be of glass, with its edge ground to provide a good seal between it and the face of the spinneret. The edge may be greased with a silicone grease.

The invention will be described with reference to the accompanying drawings, which are by way of illustration and not limitation, and in which FIGURE 1 is a diagrammatic sectional view of the extrusion portion of melt-spinning apparatus;

FIGURE 2 is a sectional view of an evacuating funnel for use in the preferred embodiment of the invention; and FIGURE 3 is a diagrammatic view partly in section, of the funnel of FIGURE 2 in place for evacuating the extrusion portion illustrated in FIGURE 1.

Referring firstly to FIGURE 1, this shows in diagrammatic form how molten polymer 1 forced downwardly from metering pump 3 advances with a convex-shaped front 5 through the solid particulate matter within the pack body 7.

This particulate matter, which is shown dotted in the drawing, fills the space within the pack body and is vertically confined between upper screen 9 and lower screen 11, the latter sitting on top of the spinneret plate 13 through which filaments 15 emerge. It will be seen that an annular pocket 17 is formed, which is, and may often be, outside the area of the spinneret in which the orifices are located; and consequently air is trapped around the solid particulate matter contained within the pocket.

In FIGURES 2 and 3, a metal evacuating funnel 19 has a hollow handle 21 which leads to a source of vacuum, above which handle a wire mesh screen 23 is fitted. The purpose of this screen is to prevent the filaments, once they have fully emerged from the orifices in the spinneret plate, from being sucked down the handle. A circular "Perspex" window 25 is made a vacuum tight fit in the front of the funnel by means of screw collar 27, and neoprene gasket 29. The funnel is frusto-conical in shape at its upper end portion and is fitted with a silicone rubber sleeve 31, the topmost part of which is adapted to extend just proud of the metal of the top of the funnel itself, and this sleeve is clamped in position by tightening the threaded ring 33, an upper flange of which bears down on a flange of a clamping ring 35. As shown particularly in FIGURE 3, the funnel is pushed upwardly into contact with the spinneret plate at the lower end of the pack body 7, the silicone rubber sleeve serving to make a vacuum tight seal with the plate, once the vacuum is applied to the funnel. The filaments 15 are observed through the window 25, and the vacuum is kept applied until all of them are at least in view, and normally it will be kept on until all the filaments have reached the screen 23.

Such an evacuating funnel may be provided at each melt-spinning unit of an entire machine; but a less costly arrangement is to provide a portable evacuating funnel assembly capable of servicing a number of melt-spinning units. Such an assembly is conveniently carried on a trolley.

In operation, the vacuum, say of at least less than 10 mm., is applied to the pack at the same time as, or shortly before the time, the metering pump is started, and application is continued until after all the filaments are observed fully to have emerged from the orifices. The vacuum is then released at a point down the line, and the funnel is removed and spinning continues in the ordinary way. If the vacuum is released too soon, say after the filaments have been observed just to have emerged from the orifices, air is likely to be drawn back in through the orifices with the results that are sought to be avoided, as the ends of the filaments will withdraw somewhat on the release of the vacuum.

It is not, in fact, relevant to the efficacy of the invention whether aluminium foil is used in the pack or not. This is due to the rupture of the foil immediately prior to the arrival of the molten material, which rupture enables the expulsion of air, as by the evacuation of the lower part of the pack, to be achieved as in the case when no foil is used, and thus no annular "pocket" of air is allowed to remain such as would cause "spitting."

It may sometimes be desirable to pass steam through the pack, on the completion of evacuating the air from it; and, indeed steam may be employed, in place of evacuation, as the means for expelling air from within the pack, by diffusing it, or sucking it through the pack prior to the start of the meter pump, but the results achieved are not so good as those achieved by evacuation.

As an example of the invention, and as a comparison of the results achieved thereby with results to be expected in a comparable conventional melt-spinning process, we give below some details of a process consisting in the melt-spinning of polyhexamethylene adipamide at a throughput of 1½ pounds per hour through a six-holed spinneret. The procedure of the comparative test is to count the number of "spitting" holes in the first hour of extrusion through evacuated packs and non-evacuated packs respectively. Eight of each variety of pack were tested; and for normal (non-evacuated) packs, "spitting" was continuous for periods greater than 40 minutes, with numerous occurrences (more than 20 a minute) during the first 5 minutes, and an average of 2 occurrences a minute thereafter; whereas with the evacuated packs, "spitting" only occurred in two of them, and then only for 10 minutes and 6 minutes after the start of extrusion, and both of them at the low rate of 2 occurrences a minute.

By use of the invention, there are certain processes which are now able to be operated for the first time on a truly economic basis. For instance, larger diameter packs (and spinnerets) can be used, such as are desirable for the proper extrusion of a number of filaments, without incurring a penal "spitting" rate such as has been previously been the experience when spinning, say, a number of 20-denier filaments of polyhexamethylene adipamide from a 3⅛ inch diameter spinneret.

Although polyhexamethylene adipamide filaments have been exemplified above, it is to be understood that the invention may be practised with advantage when melt-spinning any synthetic polymer filaments, such as those referred to in the preamble to this specification.

What I claim is:

1. Process for melt-spinning synthetic polymer filaments comprising the steps of initially expelling air from an unused pack of a melt-spinning unit, forwarding molten polymer under pressure to the pack to commence spinning through said unit, maintaining the pack substantially free of air and its constituent gases until all the filaments have fully emerged from the spinneret orifices of the pack, and then extruding the molten polymer through said orifices in the form of continuous filaments.

2. Process in accordance with claim 1, in which the air is expelled and the pack maintained free of gas by evacuation.

3. Process in accordance with claim 2, in which vacuum is applied to the pack through the spinneret orifices.

4. In combination with a melt-spinning apparatus comprising a filter pack and a spinneret, a source of vacuum and a funnel communicating therewith, and means associated with the open end of the funnel adapted to be temporarily engaged in vacuum-tight sealing relationship with said spinneret.

5. Apparatus as defined in claim 4, wherein said means comprises a heat-resistant rubber sleeve.

6. Apparatus as defined in claim 4 wherein said funnel is metal and provided with a gas-tight viewing window.

7. Apparatus as defined in claim 4, wherein said funnel includes a screen adapted to confine filaments extruded through the spinneret to the funnel.

References Cited in the file of this patent

UNITED STATES PATENTS 2,278,875   Graves _____ Apr. 7, 1942